United States Patent
You et al.

(10) Patent No.: US 8,798,178 B2
(45) Date of Patent: Aug. 5, 2014

(54) METHOD AND DEVICE FOR CHANNEL ESTIMATION IN ORTHOGONAL FREQUENCY DIVISION MULTIPLEXING SYSTEM

(75) Inventors: Yueyi You, Shenzhen (CN); Haiyong Xiao, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 88 days.

(21) Appl. No.: 13/575,900

(22) PCT Filed: Nov. 2, 2010

(86) PCT No.: PCT/CN2010/078354
§ 371 (c)(1), (2), (4) Date: Jul. 27, 2012

(87) PCT Pub. No.: WO2011/116606
PCT Pub. Date: Sep. 29, 2011

(65) Prior Publication Data
US 2012/0300884 A1    Nov. 29, 2012

(30) Foreign Application Priority Data
Mar. 24, 2010 (CN) .......................... 2010 1 0138069

(51) Int. Cl.
*H04K 1/10* (2006.01)

(52) U.S. Cl.
USPC .......................................................... 375/260

(58) Field of Classification Search
USPC .......... 375/146, 259, 260, 267, 340, 341, 348
See application file for complete search history.

(56) References Cited

U.S. PATENT DOCUMENTS

| 2004/0257979 | A1* | 12/2004 | Ro et al. ................. 370/208 |
| 2008/0240304 | A1* | 10/2008 | Oh et al. ................. 375/341 |
| 2009/0257381 | A1* | 10/2009 | Kuri et al. ............... 370/329 |
| 2009/0318158 | A1* | 12/2009 | Yamada et al. ........... 455/450 |

FOREIGN PATENT DOCUMENTS

| CN | 1925471 | 3/2007 |
| CN | 1981498 | 6/2007 |
| CN | 101534281 | 9/2009 |
| EP | 1 971 096 | 9/2008 |
| WO | WO-2004/095730 | 11/2004 |

OTHER PUBLICATIONS

International Search Report for PCT/CN2010/078354, dated Feb. 3, 2011.
Sharp: "Shorter UE ID for Downlink Scheduling Information", 3GPP, R1-062779, 3GPP TSG-RAN WG#46 bis, Seoul, Korea, Oct. 9-Oct. 13, 2006.

* cited by examiner

Primary Examiner — Sam K Ahn
Assistant Examiner — Syed Haider
(74) Attorney, Agent, or Firm — Foley & Lardner LLP

(57) ABSTRACT

The present invention discloses a channel estimation method and device in an orthogonal frequency division multiplexing system. The method includes steps of: A. grouping physical resource blocks in the bandwidth of the orthogonal frequency division multiplexing system; B. extracting at least one group from groups for channel estimation to acquire a channel coefficient, wherein the number of the extracted groups is less than the total number of groups; C. completing the MIMO demodulation by using the acquired channel coefficient; D. judging whether the channel estimation on the grouping has been completed, if yes, ending, otherwise, returning to step B. The device divides the physical resource blocks (PRB) in the bandwidth of the orthogonal frequency division multiplexing system into several groups and then carries out channel estimation processing on each group of resource blocks successively and individually, so as to achieve memory sharing and save storage amount.

8 Claims, 6 Drawing Sheets

100, 178 B2

METHOD AND DEVICE FOR CHANNEL ESTIMATION IN ORTHOGONAL FREQUENCY DIVISION MULTIPLEXING SYSTEM

TECHNICAL FIELD

The present invention relates to the channel estimation technology, and particularly, to a channel estimation method and device in an orthogonal frequency division multiplexing system.

BACKGROUND OF THE RELATED ART

In the wireless communication system, channel estimation is necessary. At the receiving end, the corresponding estimation needs to be carried out on the channel firstly during signal detection and the measurement of various parameters, and then operations such as signal detection is performed by using the estimated channel coefficient. In the 3GPP (3rd Generation Partnership Project) LTE (Long Term Evolution) system, the OFDMA (Orthogonal Frequency Division Multiple Access) technology is employed, therefore, the channels in the time domain and frequency domain need to be estimated.

The channel estimation in the OFDM (Orthogonal Frequency Division Multiplexing) system takes the 2-D Wiener estimator as the best estimator theoretically, and the estimator can be used to carry out channel estimation on all the subcarriers in the OFDM system.

Currently, there are mainly two commonly-used LTE terminal channel estimation methods:

I. the time domain interpolation is firstly carried out and then frequency domain interpolation is carried out; the channel estimation on each OFDM symbol can be dynamically calculated by way of 3 times upsampling frequency domain interpolation, however in this method, the calculation complexity is very high since there are too many frequency domain interpolations.

II. the frequency domain interpolation is firstly carried out and then time domain interpolation is carried out; the 6 times upsampling frequency domain interpolation method can be used for the OFDM symbol containing RS (reference signal) and the channel estimation on the OFDM symbol which doesn't contain RS is calculated by using the interpolation result. The defects of this method lie in: on one hand, the frequency domain interpolation result has to be stored, resulting in large storage amount; and on the other hand, the frequency domain interpolation is performed by using the 6 times upsampling method, the loss of the channel estimation performance is significant, especially under the channel condition that the frequency selectivity is strong.

SUMMARY OF THE INVENTION

One of the objects of the present invention is to provide a channel estimation method and device in an orthogonal frequency division multiplexing system, which can achieve memory sharing and save storage amount.

In order to achieve the above object, the technical solution in the present invention is implemented as follows:

the present invention provides a channel estimation method in an orthogonal frequency division multiplexing system, comprising steps of:

A. grouping physical resource blocks in a bandwidth of the orthogonal frequency division multiplexing system;

B. extracting at least one group from groups for channel estimation to acquire a channel coefficient, wherein the number of extracted groups is less than the total number of groups;

C. completing multiple input multiple output (MIMO) demodulation by using the acquired channel coefficient; and D. judging whether the channel estimation on grouping has been completed, and if yes, ending, otherwise, returning to step B.

The channel estimation comprises the steps of:

estimating the channel coefficient at a reference signal;

carrying out a first time domain interpolation, changing reference signal density at an orthogonal frequency division multiplexing (OFDM) symbol containing the reference signal to ⅓ of the reference signal density, and calculating the channel coefficient of resource element at the OFDM symbol containing the reference signal;

carrying out 3 times upsampling frequency domain interpolation on the OFDM symbol containing the reference signal and acquiring the channel coefficient at the OFDM symbol containing the reference signal; and carrying out a second time domain interpolation, calculating the channel coefficient at an OFDM symbol that doesn't contain the reference signal by using the channel coefficient at the OFDM symbol containing the reference signal, so as to acquire the channel coefficients at all the OFDM symbols.

Calculating the channel coefficient of the resource element comprises the steps of:

distinguishing information of the resource element and calculating the channel coefficient of the resource element according to the information of the resource element.

The channel estimation is done according to a following equation:

$$\tilde{H}_i(l_1, k) = \frac{l_2 - l_1}{l_2 - l_0} H_{i-1}(l'_0, k) + H_i(l'_1, k) + \frac{l_1 - l_0}{l_2 - l_0} H_i(l'_2, k)$$

the $$l'_0 = \begin{cases} l_0 & \text{if } l_0 \geq 0 \\ l_0 + N_{SymDL} & \text{if } l_0 < 0 \end{cases},$$

$$l'_1 = \begin{cases} l_1 & \text{if } l_1 < N_{SymDL} \\ l_1 + N_{SymDL} & \text{if } l_1 \geq N_{SymDL} \end{cases}, \text{ and}$$

$$l'_2 = \begin{cases} l_2 & \text{if } l_2 < N_{SymDL} \\ l_2 - N_{SymDL} & \text{if } l_2 \geq N_{SymDL} \end{cases};$$

wherein $N_{SymDL}$ is the number of OFDM symbols in a single subframe; $\tilde{H}_i(l_1', k)$ represents a channel estimation value of a kth subcarrier of the OFDM symbol of a current subframe before modification; $\tilde{H}_i(l_1, k)$ represents a channel estimation value of the kth subcarrier of the OFDM symbol of the current subframe after modification; i represents the current subframe; i−1 represents a previous subframe, and k is an arrangement location of subcarrier.

The step of distinguishing information of the resource element and calculating the channel coefficient of the resource element according to the information of the resource element comprises:

judging whether or not it is a resource element on a first OFDM symbol within the current sub frame;

if yes, then judging whether the previous subframe of the resource element is a downlink subframe, if yes, then carrying out linear interpolation on the channel coefficient of the resource element by using channel coefficients of a previous resource element and a next resource element of the resource element, and if no, then carrying out linear prediction to obtain by using the channel coefficients of next two resource elements of the resource element; and if it is not a resource element on the first OFDM symbol within the current subframe, then carrying out linear interpolation on the channel coefficient of the resource element by using the channel coefficients of the previous resource element and next resource element of the resource element.

The channel estimation comprises the steps of:

estimating the channel coefficient at a reference signal;

carrying out 6 times upsampling frequency domain interpolation on an OFDM symbol containing the reference signal and acquiring the channel coefficient at the OFDM symbol containing the reference signal;

carrying out a first time domain interpolation, and modifying the channel coefficient at the OFDM symbol containing the reference signal; and carrying out a second time domain interpolation, calculating the channel coefficient at an OFDM symbol that doesn't contain the reference signal by using the channel coefficient at the OFDM symbol containing the reference signal, so as to acquire the channel coefficients at all the OFDM symbols.

The present invention also provides a channel estimation device in an orthogonal frequency division multiplexing system, comprising:

a grouping module, which groups physical resource blocks in a bandwidth of the orthogonal frequency division multiplexing system;

an extraction estimation module, which extracts at least one group from groups for channel estimation to acquire a channel coefficient, wherein the number of extracted groups is less than the total number of groups;

a check module, which completes MIMO demodulation by using the acquired channel coefficient; and a judgment module, which judges whether or not the channel estimation on grouping has been completed and notifies the extraction estimation module to continue extracting a group for channel estimation when the channel estimation has not been completed.

The extraction estimation module comprises:

a first estimation unit, which estimates the channel coefficient at a reference signal;

a first time domain interpolation unit, which carries out a first time domain interpolation, and changes reference signal density at an OFDM symbol containing the reference signal to ⅓ of the reference signal density, and calculates the channel coefficient of a resource element at the OFDM symbol containing the reference signal;

a first frequency domain interpolation unit, which carries out 3 times upsampling frequency domain interpolation on the OFDM symbol containing the reference signal and acquires the channel coefficient at the OFDM symbol containing the reference signal; and a second time domain interpolation unit, which carries out a second time domain interpolation, and calculates the channel coefficient at an OFDM symbol that doesn't contain the reference signal by using the channel coefficient at the OFDM symbol containing the reference signal, so as to acquire the channel coefficients at all the OFDM symbols.

In this case, the first time domain interpolation unit comprises:

a first judgment subunit, which judges whether or not it is a resource element on a first OFDM symbol within a current subframe;

a second judgment subunit, which judges whether or not a previous subframe of the resource element on the first OFDM symbol within the current subframe is a downlink sub frame;

a first calculation subunit, which carries out linear interpolation on the channel coefficient of the resource element by using channel coefficients of a previous resource element and a next resource element of the resource element; and a second calculation subunit, which carries out linear prediction to obtain by using channel coefficients of next two resource elements of the resource element.

The extraction estimation module comprises:

a second estimation unit, which estimates a channel coefficient at a reference signal;

a second frequency domain interpolation unit, which carries out 6 times upsampling frequency domain interpolation on an OFDM symbol containing the reference signal and acquire the channel coefficient at the OFDM symbol containing the reference signal;

a third time domain interpolation unit, which carries out a first time domain interpolation, and modifies the channel coefficient at the OFDM symbol containing the reference signal; and a fourth time domain interpolation unit, which carries out a second time domain interpolation, and calculates the channel coefficient at an OFDM symbol that doesn't contain the reference signal by using the channel coefficient at the OFDM symbol containing the reference signal, so as to acquire the channel coefficients at all the OFDM symbols.

The channel estimation method and device in an orthogonal frequency division multiplexing system in the present invention is as follows: firstly grouping the physical resource blocks in the bandwidth of the orthogonal frequency division multiplexing system and then carrying out channel estimation processing on each group of resource blocks successively and individually, so as to achieve memory sharing and save storage amount.

The implementation, function features and advantages of objects of the present invention will be further described by reference to the accompanying drawings.

PREFERRED EMBODIMENTS OF THE PRESENT INVENTION

The channel estimation method and device in an orthogonal frequency division multiplexing system in the present invention is as follows: firstly dividing the physical resource blocks (PRB) in the bandwidth of the orthogonal frequency division multiplexing system into several groups and then carrying out channel estimation processing on each group of physical resource blocks successively and individually, so as to achieve memory sharing and save storage amount. In addition, as to the channel estimation method of each group of physical resource blocks, on one hand, the channel estimation result of the OFDM (Orthogonal Frequency Division Multiplexing) symbol containing the reference signal (RS) is optimized so as to ensure the channel estimation performance; on the other hand, frequency domain interpolation is only carried out on the OFDM symbol containing the reference signal so as to reduce the number of times of frequency domain interpolation, thus reducing the calculation complexity.

Figure 1:
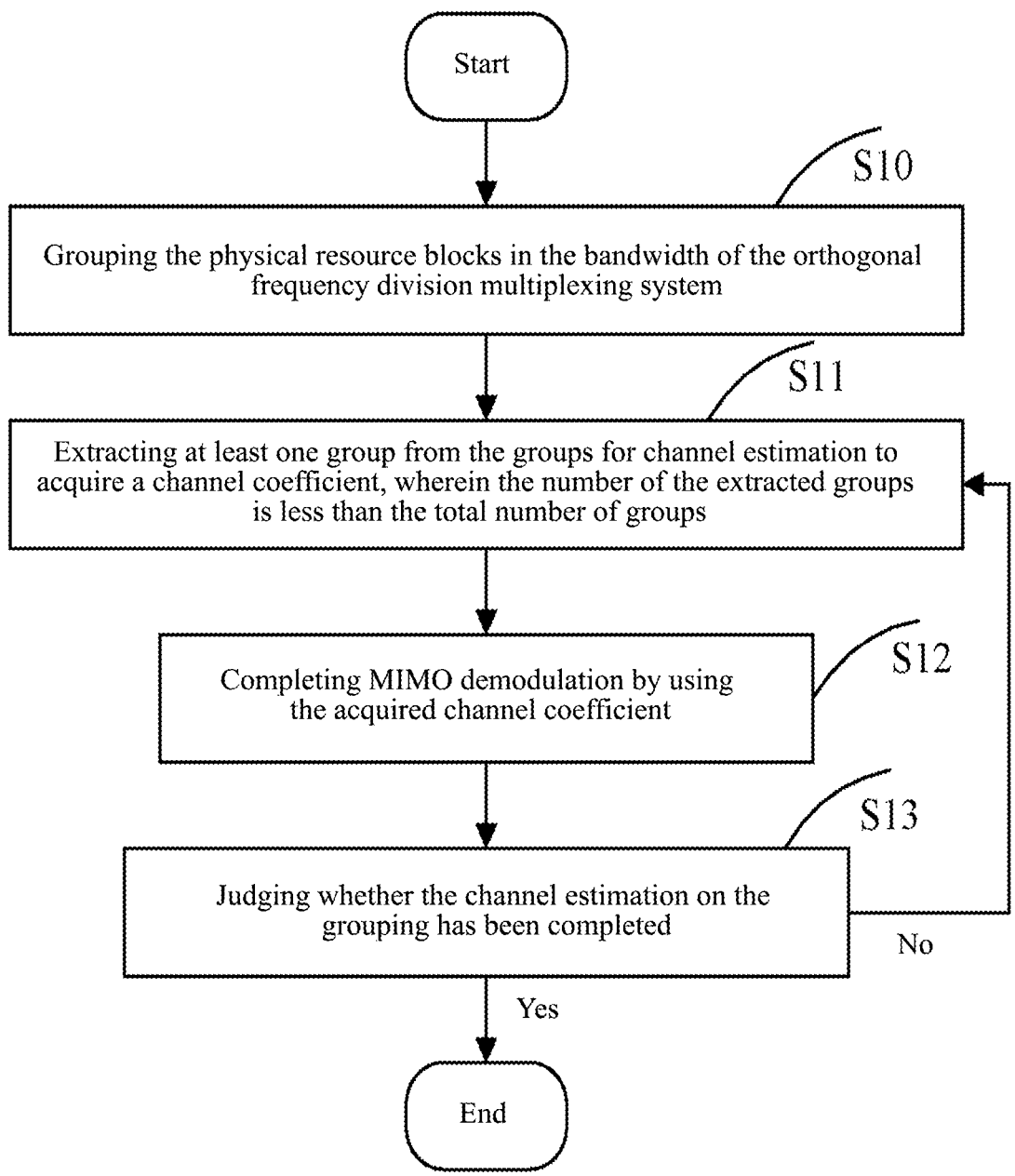
FIG. 1 is a schematic flowchart of the steps of a channel estimation method in an orthogonal frequency division multiplexing system according to an embodiment of the present invention.

Referring to FIG. 1, a channel estimation method in an orthogonal frequency division multiplexing system is proposed according to an embodiment of the present invention, comprising:

in step S10, grouping the physical resource blocks in the bandwidth of the orthogonal frequency division multiplexing system;

in step S11, extracting at least one group from the groups for channel estimation to acquire a channel coefficient, wherein the number of the extracted groups is less than the total number of groups;

in step S12, completing MIMO demodulation by using the acquired channel coefficient; and in step S13, judging whether the channel estimation on the grouping has been completed, if yes, then it ending, otherwise, returning to step S11.

As mentioned in step S10, it can be assumed that the bandwidth of the orthogonal frequency division multiplexing system includes N physical resource blocks, and these N physical resource blocks are divided into M groups, with each group including K continuous physical resource blocks, wherein N=M*K. And, the M groups of physical resource blocks are numbered as 1, 2, . . . , M successively.

As mentioned in step S11, channel estimation can be carried out on each group of physical resource blocks successively and respectively so as to acquire a channel coefficient. When carrying out channel estimation, at least one group can be extracted from the above groups for calculating the channel coefficient, and after the channel estimation is completed, other groups of physical resource blocks are extracted for channel estimation until the channel estimation of all the groups are completed. And, the number of extracted groups each time is less than the total number of groups (M). For example, the Ith group in the groups 1 to M can be firstly extracted for channel estimation, and after it is completed, then the (I+1)th group is extracted, and so on, until the channel estimation on the groups 1 to M is completed successively.

Here, the channel estimation doesn't have a limitation for the used channel estimation method.

As mentioned in step S12, after each channel estimation is done, the acquired channel coefficient can be used to complete the MIMO (Multiple-Input Multiple-Out-put) demodulation, and then that channel coefficient is discarded.

As mentioned in step S13, after one channel estimation is completed, the channel coefficient is obtained and the MIMO demodulation is completed, and it is judged whether or not the channel estimation on all the groups is completed, if it is, then it ends, otherwise, the channel estimation on the groups is continued (return to step S11), and steps S11 and S12 loops until all the channel estimation is completed.

The channel estimation method in an orthogonal frequency division multiplexing system in the present embodiment is as follows: firstly dividing the physical resource blocks (PRB) in the bandwidth of the orthogonal frequency division multiplexing system into several groups and then carrying out channel estimation processing on each group of resource blocks successively and individually, so as to achieve memory sharing and save storage amount.

Figure 2:
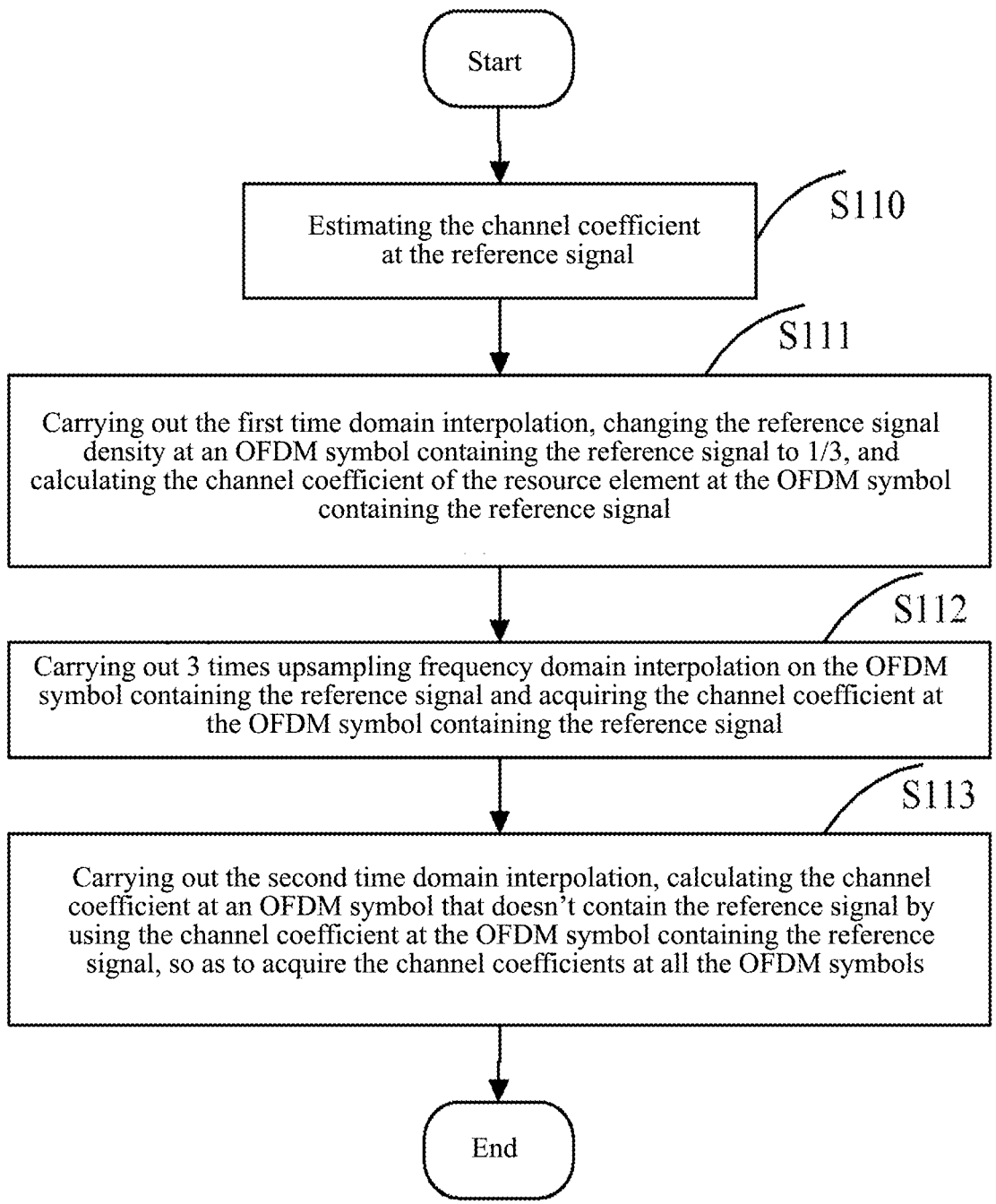
FIG. 2 is a schematic flowchart of the steps of a channel estimation method according to another embodiment of the present invention.

Referring to FIG. 2, a channel estimation method in an orthogonal frequency division multiplexing system is proposed according to another embodiment of the present invention. In this case, the channel estimation in the above step S11 can comprise:

in step S110, estimating the channel coefficient at the reference signal;

in step S111, carrying out the first time domain interpolation, changing the reference signal density at an OFDM symbol containing the reference signal to ⅓ of the reference signal density, and calculating the channel coefficient of the resource element at the OFDM symbol containing the reference signal;

in step S112, carrying out 3 times upsampling frequency domain interpolation on the OFDM symbol containing the reference signal and acquiring the channel coefficient at the OFDM symbol containing the reference signal; and in step S113, carrying out the second time domain interpolation, calculating the channel coefficient at an OFDM symbol which doesn't contain the reference signal by using the channel coefficient at the OFDM symbol containing the reference signal, so as to acquire the channel coefficients at all the OFDM symbols.

As mentioned in step S110, the channel coefficient at the reference signal (RS) needs to be estimated firstly.

As mentioned in step S111, during the first time domain interpolation, only the channel coefficient at the OFDM symbol containing the reference signal is calculated.

Figure 3:
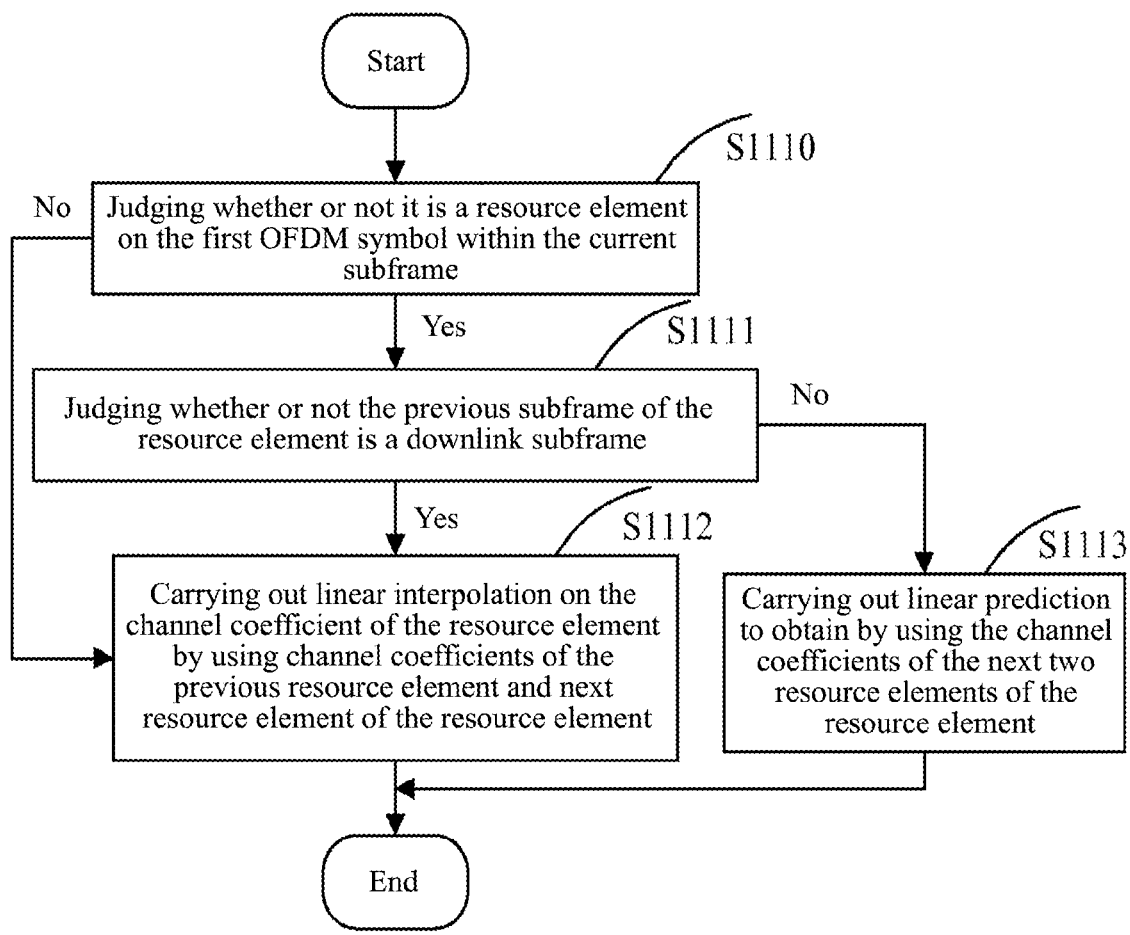
FIG. 3 is a schematic flowchart of the steps of calculating the channel coefficient of a resource element in an implementation according to another embodiment of the present invention

Referring to FIG. 3, in an implementation of this embodiment, calculating the channel coefficient of the above resource element comprises:

in step S1110, judging whether or not it is a resource element on the first OFDM symbol within the current subframe, if yes, then proceeding to step S1111, otherwise, proceeding to step S1112;

in step S1111, judging whether or not the previous subframe of the resource element is a downlink subframe, if yes, then proceeding to step S1112, otherwise, proceeding to step S1113;

in step S1112, carrying out linear interpolation on the channel coefficient of the above resource element by using channel coefficients of the previous resource element and the next resource element of the above resource element; and in step S1113, carrying out linear prediction to obtain by using the channel coefficients of the next two resource elements of the above resource element.

When calculating the channel coefficient of the resource element, the information of the resource element is firstly distinguished, and then the channel coefficient of the resource element is calculated according to the information of the resource element. The information can include whether or not it is a resource element on the first OFDM symbol within the current subframe and whether or not the previous subframe is a downlink subframe and so on.

Figure 4:
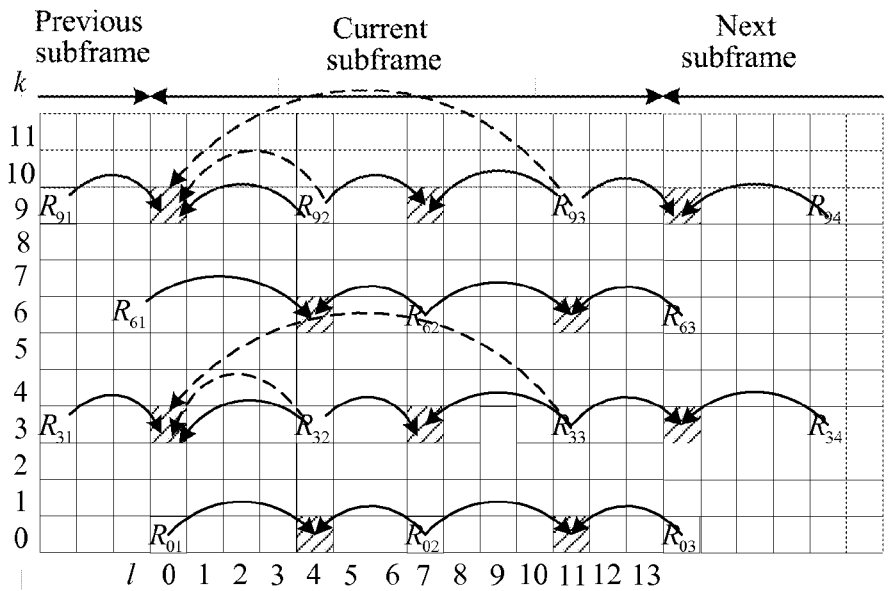
FIG. 4 is a schematic diagram of the first time domain interpolation according to another embodiment of the present invention.

Referring to FIG. 4, the first time domain interpolation needs to calculate the channel coefficient of the resource element (RE) on 0#, 4#, 7#, and 11# OFDM symbols, as shown by the slash filled portion in FIG. 4. If the previous subframe of the current subframe containing the slash filled portion is a downlink subframe, then the time domain interpolation process is as shown by the solid line in FIG. 4, and linear interpolation is carried out on the channel coefficient at the resource element indicated by the arrow by using the channel coefficient of the reference signal at the starting position of the arrow ($R_{91}$ and $R_{92}$, or $R_{31}$ and $R_{32}$). If the previous subframe is not a downlink subframe, the channel coefficient of the 0#OFDM symbol needs to be linearly predicted and obtained by using the channel coefficient of the reference signal at the starting position of the dashed arrow ($R_{92}$ and $R_{93}$, or $R_{32}$ and $R_{33}$), and the calculation of the channel coefficients of the remaining resource elements is consistent with the calculation where the previous subframe is a downlink subframe.

As mentioned in step S112, the channel coefficient at the OFDM symbol containing the reference signal can be acquired by carrying out 3 times upsampling frequency domain interpolation on the OFDM symbol containing the reference signal. That sampling can be implemented by using FIR (Finite Impulse Response) filtering or IFFT (Inverse Fast Fourier Transform)/FFT (Fast Fourier Transform) interpolation.

As mentioned in step S113, after having acquired the channel coefficient at the OFDM symbol containing the reference signal, the second time domain interpolation is carried out, and the channel coefficient at the OFDM symbol which doesn't contain the reference signal is calculated by using the channel coefficient at the OFDM symbol containing the reference signal so as to acquire the channel coefficients of all the OFDM symbols.

The above time domain or frequency domain interpolation can refer to the provisions of the LTE (Long Term Evolution) protocol.

In the channel estimation method in the orthogonal frequency division multiplexing system in this embodiment, the channel estimation performance is ensured by optimizing the channel estimation result of the OFDM symbol containing the reference signal.

Figure 5:
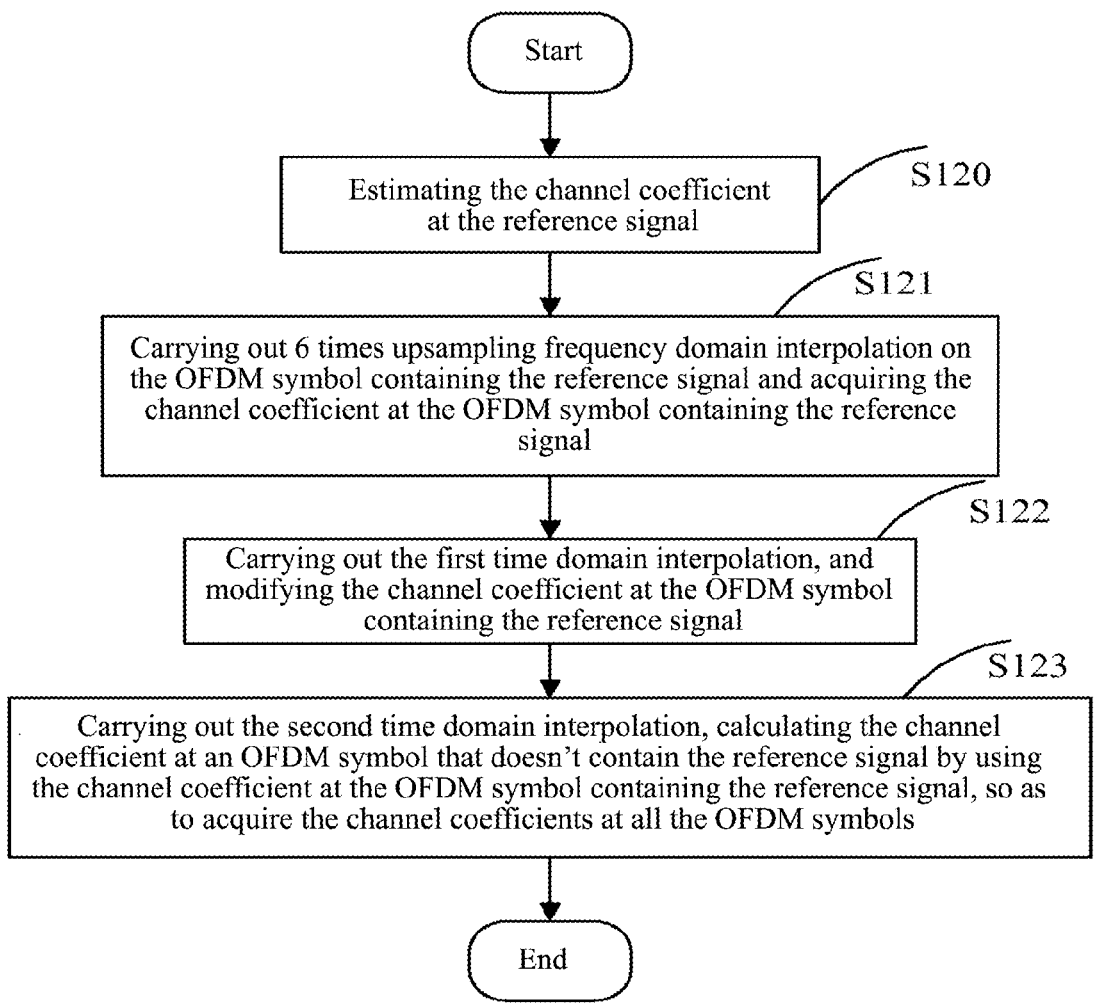
FIG. 5 is a schematic flowchart of the steps of a channel estimation method according to yet another embodiment of the present invention.

Referring to FIG. 5, a channel estimation method in an orthogonal frequency division multiplexing system is proposed according to yet another embodiment of the present invention. In this case, the above channel estimation comprises:

in step S120, estimating the channel coefficient at the reference signal;

in step S121, carrying out 6 times upsampling frequency domain interpolation on the OFDM symbol containing the reference signal and acquiring the channel coefficient at the OFDM symbol containing the reference signal;

in step S122, carrying the first time domain interpolation, and modifying the channel coefficient at the OFDM symbol containing the reference signal; and in step S123, carrying out the second time domain interpolation, calculating the channel coefficient at an OFDM symbol which doesn't contain the reference signal by using the channel coefficient at the OFDM symbol containing the reference signal, so as to acquire the channel coefficients at all the OFDM symbols.

As mentioned in step S120, the channel coefficient at the reference signal (RS) needs to be estimated firstly.

As mentioned in step S121, the channel coefficient at the OFDM symbol containing the reference signal can be acquired by carrying out 6 times upsampling frequency domain interpolation on the OFDM symbol containing the reference signal. This sampling can be implemented by using FIR filtering or IFFT/FFT interpolation.

As mentioned in step S122, after having acquired the frequency domain interpolation result at the OFDM symbol containing the reference signal, the first time domain interpolation is started, and the channel coefficient at the OFDM symbol containing the reference signal (0#, 4#, 7# and 11#) is modified.

Figure 6:
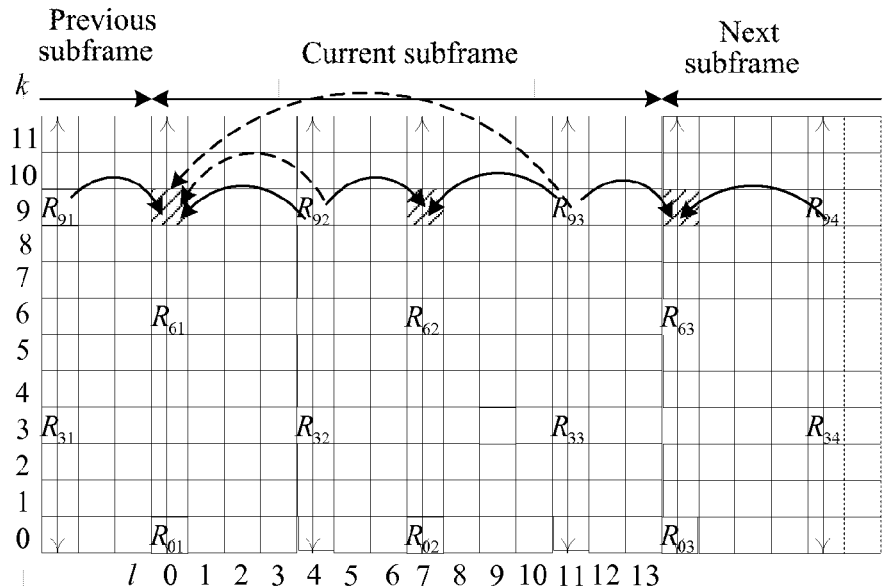
FIG. 6 is a schematic diagram of the first time domain interpolation according to yet another embodiment of the present invention.

Referring to FIG. 6, when modifying the channel estimation of the 0#OFDM symbol of the current subframe, if the previous subframe thereof is a downlink subframe, linear interpolation is carried out on the 0#OFDM symbol of the current subframe by using the 11#OFDM symbol of the previous subframe and the 4#OFDM symbol of the current subframe, to which the channel estimation of the 0#OFDM symbol of the current subframe is added. If the previous subframe is not a downlink subframe, linear interpolation is carried out on the 0#OFDM symbol of the current subframe by using the 4#OFDM symbol of the current subframe and the 11#OFDM symbol of the current subframe, to which the channel estimation of the 0#OFDM symbol of the current subframe is added. The equation is as follows:

$$\tilde{H}_i(l_1, k) = \frac{l_2 - l_1}{l_2 - l_0} H_{i-1}(l_0', k) + H_i(l_1', k) + \frac{l_1 - l_0}{l_2 - l_0} H_i(l_2', k) \quad (1)$$

Where, the $$l_0' = \begin{cases} l_0 & \text{if } l_0 \geq 0 \\ l_0 + N_{SymDL} & \text{if } l_0 < 0 \end{cases},$$

$$l_1' = \begin{cases} l_1 & \text{if } l_1 < N_{SymDL} \\ l_1 + N_{SymDL} & \text{if } l_1 \geq N_{SymDL} \end{cases} \text{ and}$$

$$l_2' = \begin{cases} l_2 & \text{if } l_2 < N_{SymDL} \\ l_2 - N_{SymDL} & \text{if } l_2 \geq N_{SymDL} \end{cases};$$

wherein $N_{SymDL}$ is the number of OFDM symbols in a single subframe, $\tilde{H}_i(l_1', k)$ represents the channel estimation value of the kth subcarrier of the $l_1'$#OFDM symbol of the current subframe before modification; $\tilde{H}_i(l_1, k)$ represents the channel estimation value of the kth subcarrier of the $l_1$#OFDM symbol of the current subframe after modification; i represents the current subframe; i−1 represents the previous subframe, and k is the arrangement location of the subcarrier, here, it is the kth subcarrier of the 0#OFDM symbol.

If the previous subframe is a downlink subframe, then let $l_0 = -3$, $l_1 = 0$, $l_2 = 4$, which are substituted into equation (1) for calculating channel coefficient.

If the previous subframe is not a downlink subframe, then let $l_0 = 11$, $l_1 = 0$, $l_2 = 4$, which are substituted into equation (1) for calculating channel coefficient.

When modifying the channel estimation of the 4#OFDM symbol of the current subframe, linear interpolation can be carried out on the 4#OFDM symbol of the current subframe by using the 7#OFDM symbol of the current subframe and the 0#OFDM symbol of the current subframe, and then the channel estimation of the 4#OFDM symbol of the current subframe is added thereto, i.e. k=4. Equation (1) can be used to calculate the channel coefficient, let $l_0=0$, $l_1=4$ and $l_2=7$, which are substituted into equation (1) for calculation.

When modifying the channel estimation of the 7#OFDM symbol of the current subframe, linear interpolation can be carried out on the 7#OFDM symbol of the current subframe by using the 11#OFDM symbol of the current subframe and the 4#OFDM symbol of the current subframe, and then the channel estimation of the 7#OFDM symbol of the current subframe is added thereto, i.e. k=7. Equation (1) can be used to calculate the channel coefficient, let $l_0=4$, $l_1=7$ and $l_2=11$, which are substituted into equation (1) for calculation.

When modifying the channel estimation of the 11#OFDM symbol of the current subframe, linear interpolation can be carried out on the 11#OFDM symbol of the current subframe by using the 7#OFDM symbol of the current subframe and the 0#OFDM symbol of the next subframe, and then the channel estimation of the 11 #OFDM symbol of the current subframe is added thereto, i.e. k=11. Equation (1) can be used to calculate the channel coefficient, let $l_0=7$, $l_1=11$ and $l_2=14$, which are substituted into equation (1) for calculation.

When modifying the channel estimation of the 0#OFDM symbol of the next subframe, linear interpolation can be carried out on the 0#OFDM symbol of the next subframe by using the 11#OFDM symbol of the current subframe and the 4#OFDM symbol of the next subframe, and then the channel estimation of the 0#OFDM symbol of the next subframe is added thereto. Equation (1) can be used to calculate the channel coefficient, let $l_0=11$, $l_1=14$ and $l_2=18$, which are substituted into equation (1) for calculation.

As mentioned in step S123, after the first time domain interpolation, then the second time domain interpolation is started, and the channel coefficient at an OFDM symbol which doesn't contain the reference signal can be calculated by using the channel coefficient at the OFDM symbol containing the reference signal, so as to acquire the channel coefficients at all the OFDM symbols.

In the channel estimation method in the orthogonal frequency division multiplexing system in this embodiment, by way of only carrying out frequency domain interpolation on the OFDM symbol containing the reference signal, the number of times of frequency domain interpolations is reduced, thus reducing the calculation complexity.

Figure 7:
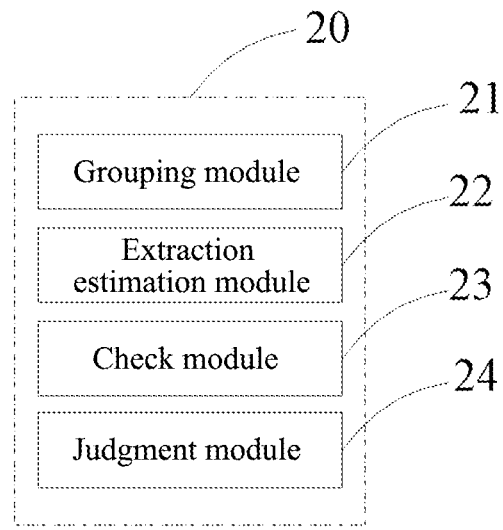
FIG. 7 is a structural schematic diagram of a channel estimation device in an orthogonal frequency division multiplexing system according to an embodiment of the present invention.

Referring to FIG. 7, a channel estimation device 20 in an orthogonal frequency division multiplexing system is proposed according to an embodiment of the present invention, comprising:

a grouping module 21, which groups physical resource blocks in a bandwidth of the orthogonal frequency division multiplexing system;

an extraction estimation module 22, which extracts at least one group from groups for channel estimation to acquire a channel coefficient, wherein the number of extracted groups is less than the total number of groups;

a check module 23, which completes MIMO demodulation by using the channel coefficient acquired by the extraction estimation module 22; and a judgment module 24, which judges whether or not the channel estimation on grouping has been completed and notifies the extraction estimation module 22 to continue extracting a group for channel estimation when the channel estimation has not been completed.

It can be assumed by the above grouping module 21 that the bandwidth of the orthogonal frequency division multiplexing system includes N physical resource blocks, and these N physical resource blocks are divided into M groups, with each group including K continuous physical resource blocks, wherein N=M*K. And, the M groups of resource blocks are numbered as 1, 2, ..., M successively.

The above extraction estimation module 22 can carry out channel estimation on each group of physical resource blocks successively and respectively so as to acquire a channel coefficient. When carrying out channel estimation, at least one group can be extracted from the above groups for calculating the channel coefficient, and after the channel estimation is completed, other groups of physical resource blocks are extracted for channel estimation until the channel estimation of all the groups are completed. And, the number of extracted groups each time is less than the total number of groups (M). For example, the Ith group in the groups 1 to M can be firstly extracted for channel estimation, after it is completed, then the (I+1)th group is extracted, and so on, until the channel estimation on the groups 1 to M is completed successively. Here, the channel estimation doesn't have a limitation for the used channel estimation method.

After each channel estimation, the above check module 23 can complete MIMO (Multiple-Input Multiple-Out-put) demodulation by using the channel coefficient acquired by the extraction estimation module 22.

After one channel estimation is completed, the channel coefficient is obtained and the MIMO demodulation is completed, the above judgment module 24 judges whether or not the channel estimation on all the groups has been completed, if yes, then it ends, otherwise, the channel estimation on the groups is continued, the channel estimation and check loop until all the channel estimation is completed.

The channel estimation device 20 in an orthogonal frequency division multiplexing system in the present embodiment is as follows: firstly dividing the physical resource blocks in the bandwidth of the orthogonal frequency division multiplexing system into several groups and then carrying out channel estimation processing on each group of resource blocks successively and individually, so as to achieve memory sharing and save storage amount.

Figure 8:
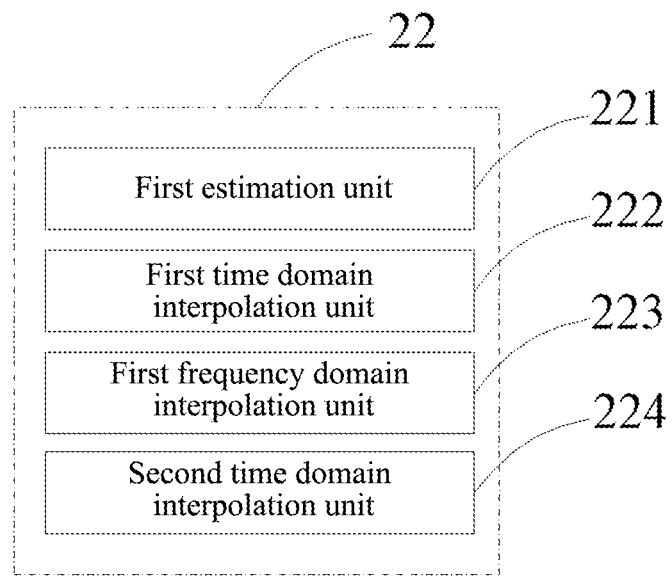
FIG. 8 is a structural schematic diagram of an extraction estimation module according to another embodiment of the present invention.

Referring to FIG. 8, a channel estimation device 20 in an orthogonal frequency division multiplexing system is proposed according to another embodiment of the present invention, and the above extraction estimation module 22 comprises:

a first estimation unit 221, which estimates the channel coefficient at a reference signal;

a first time domain interpolation unit 222, which carries out a first time domain interpolation, and changes reference signal density at an OFDM symbol containing the reference signal to ⅓ of the reference signal density, and calculates the channel coefficient of a resource element at the OFDM symbol containing the reference signal;

a first frequency domain interpolation unit 223, which carries out 3 times upsampling frequency domain interpolation on the OFDM symbol containing the reference signal and acquires the channel coefficient at the OFDM symbol containing the reference signal; and a second time domain interpolation unit 224, which carries out a second time domain interpolation, and calculates the channel coefficient at an OFDM symbol that doesn't contain the reference signal by using the channel coefficient at the OFDM symbol containing the reference signal, so as to acquire the channel coefficients at all the OFDM symbols.

The above first estimation unit 221 needs to estimate the channel coefficient at the reference signal (RS).

During the process of the first time domain interpolation, the above first time domain interpolation unit 222 calculates the channel coefficient at the OFDM symbol containing the reference signal.

Figure 9:
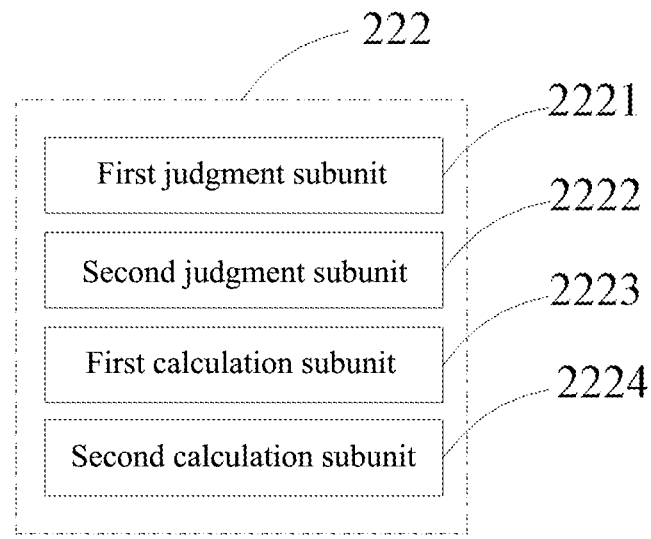
FIG. 9 is a structural schematic diagram of an extraction estimation module according to yet another embodiment of the present invention.

Referring to FIG. 9, the above first time domain interpolation unit 222 can comprise: a first judgment subunit 2221, a second judgment subunit 2222, a first calculation subunit 2223 and a second calculation unit 2224, wherein the first judgment subunit 2221 judges whether or not it is a resource element on the first OFDM symbol within the current subframe; the second judgment subunit 2222 judges whether or not the previous subframe of the resource element on the first OFDM symbol within the current subframe is a downlink subframe; the first calculation subunit 2223 carries out linear interpolation on the channel coefficient of the resource element by using the channel coefficients of the previous resource element and the next resource element of the resource element; the second calculation subunit 2224 carries out linear prediction to obtain by using the channel coefficients of the next two resource elements of the resource element.

The calculated resource element can be judged whether or not itself is a resource element on the first OFDM symbol within the current subframe by the first judgment subunit 2221, if yes, then the second judgment subunit 2222 is used to judge whether or not the previous subframe of the resource element is a downlink subframe, otherwise, the first calculation subunit 2223 carries out linear interpolation on the channel coefficient of the resource element by using the channel coefficients of the previous resource element and the next resource element of the resource element; when the previous subframe of the resource element is a downlink subframe, the first calculation subunit 2223 carries out linear interpolation on the channel coefficient of the resource element by using the channel coefficients of the previous resource element and the next resource element of the resource element; otherwise, the second calculation subunit 2224 carry out linear prediction to obtain by using the channel coefficients of the next two resource elements of the resource element.

When calculating the channel coefficient of the resource element, the information of the resource element is firstly distinguished, and then the channel coefficient of the resource element is calculated according to the information of the resource element. The information can include whether or not it is a resource element on the first OFDM symbol within the current subframe and whether or not the previous subframe is a downlink subframe and so on.

Referring to FIG. 4, the first time domain interpolation needs to calculate the channel coefficient of the resource element (RE) on 0#, 4#, 7#, and 11# OFDM symbols, as shown by the slash filled portion in FIG. 4. If the previous subframe of the current subframe containing the slash filled portion is a downlink subframe, then the time domain interpolation process is as shown by the solid line in FIG. 4, and linear interpolation is carried out on the channel coefficient at the resource element indicated by the arrow by using the channel coefficient of the reference signal at the starting position of the arrow ($R_{91}$ and $R_{92}$, or $R_{31}$ and $R_{32}$). If the previous subframe is not a downlink subframe, the channel coefficient of the 0#OFDM symbol needs to be linearly predicted and obtained by using the channel coefficient of the reference signal at the starting position of the dashed arrow ($R_{92}$ and $R_{93}$, or $R_{32}$ and $R_{33}$), and the calculation of the channel coefficients of the remaining resource elements is consistent with the calculation where the previous subframe is a downlink subframe.

The above first frequency domain interpolation unit 223 can carry out 3 times upsampling frequency domain interpolation on the OFDM symbol containing the reference signal and acquire the channel coefficient at the OFDM symbol containing the reference signal.

After having acquired the channel coefficient at the OFDM symbol containing the reference signal, the above second time domain interpolation unit 224 carries out the second time domain interpolation, and calculates the channel coefficient at the OFDM symbol which doesn't contain the reference signal by using the channel coefficient at the OFDM symbol containing the reference signal so as to acquire the channel coefficients of all the OFDM symbols.

In the channel estimation device 20 in the orthogonal frequency division multiplexing system in this embodiment, the channel estimation performance is ensured by optimizing the channel estimation result of the OFDM symbol containing the reference signal.

Figure 10:
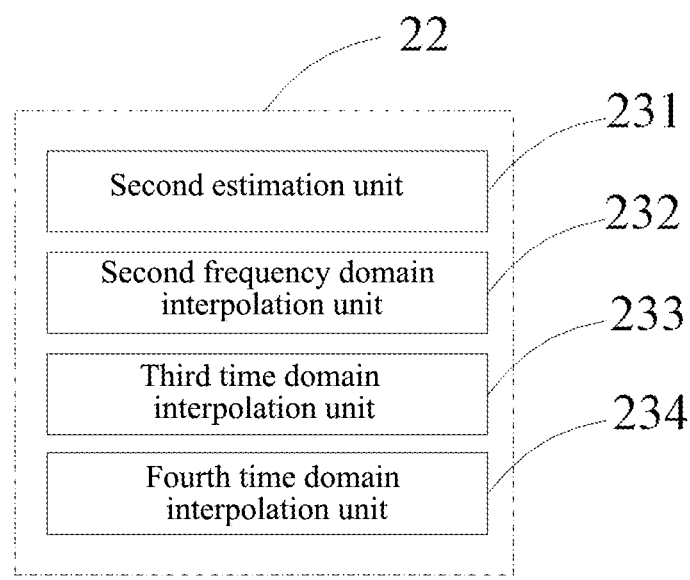
FIG. 10 is a channel estimation device in an orthogonal frequency division multiplexing system according to yet another embodiment of the present invention.

Referring to FIG. 10, a channel estimation device 20 in an orthogonal frequency division multiplexing system is proposed according to another embodiment of the present invention, and the above extraction estimation module 22 comprises:

a second estimation unit 231, which estimates a channel coefficient at a reference signal;

a second frequency domain interpolation unit 232, which carries out 6 times upsampling frequency domain interpolation on an OFDM symbol containing the reference signal and acquire the channel coefficient at the OFDM symbol containing the reference signal;

a third time domain interpolation unit 233, which carries out a first time domain interpolation, and modifies the channel coefficient at the OFDM symbol containing the reference signal; and a fourth time domain interpolation unit 234, which carries out a second time domain interpolation, and calculates the channel coefficient at an OFDM symbol that doesn't contain the reference signal by using the channel coefficient at the OFDM symbol containing the reference signal, so as to acquire the channel coefficients at all the OFDM symbols.

The above second estimation unit 231 needs to estimate the channel coefficient at the reference signal (RS).

The above second frequency domain interpolation unit 232 carries out 6 times upsampling frequency domain interpolation on the OFDM symbol containing the reference signal and acquires the channel coefficient at the OFDM symbol containing the reference signal.

After having acquired the frequency domain interpolation result of the OFDM symbol containing the reference signal, the above third time domain interpolation unit 233 starts the first time domain interpolation, and modifies the channel coefficient at the OFDM symbol containing the reference signal (0#, 4#, 7# and 11#).

Referring to FIG. 6, when modifying the channel estimation of the 0#OFDM symbol of the current subframe, if the previous subframe thereof is a downlink subframe, linear interpolation is carried out on the 0#OFDM symbol of the current subframe by using the 11#OFDM symbol of the previous subframe and the 4#OFDM symbol of the current subframe, to which the channel estimation of the 0#OFDM symbol of the current subframe is added. If the previous subframe is not a downlink subframe, linear interpolation is carried out on the 0#OFDM symbol of the current subframe by using the 4#OFDM symbol of the current subframe and the 11#OFDM symbol of the current subframe, to which the channel estimation of the 0#OFDM symbol of the current subframe is added. The equation is as follows:

$$\tilde{H}_i(l_1, k) = \frac{l_2 - l_1}{l_2 - l_0} H_{i-1}(l'_0, k) + H_i(l'_1, k) + \frac{l_1 - l_0}{l_2 - l_0} H_i(l'_2, k) \quad (1)$$

Where, the $$l'_0 = \begin{cases} l_0 & \text{if } l_0 \geq 0 \\ l_0 + N_{SymDL} & \text{if } l_0 < 0 \end{cases},$$

$$l'_1 = \begin{cases} l_1 & \text{if } l_1 < N_{SymDL} \\ l_1 + N_{SymDL} & \text{if } l_1 \geq N_{SymDL} \end{cases} \text{ and}$$

$$l'_2 = \begin{cases} l_2 & \text{if } l_2 < N_{SymDL} \\ l_2 - N_{SymDL} & \text{if } l_2 \geq N_{SymDL} \end{cases};$$

wherein $N_{SymDL}$ is the number of OFDM symbols in a single subframe, $\tilde{H}_i(l_1', k)$ represents the channel estimation value of the kth subcarrier of the $l_1'$#OFDM symbol of the current subframe before modification; $\tilde{H}_i(l_1, k)$ represents the channel estimation value of the kth subcarrier of the $l_1$#OFDM symbol of the current subframe after modification; i represents the current subframe; i-1 represents the previous subframe, and k is the arrangement location of the subcarrier, here, it is the kth subcarrier of the 0#OFDM symbol.

If the previous subframe is a downlink subframe, then let $l_0=-3$, $l_1=0$, $l_2=4$, which are substituted into equation (1) for calculating channel coefficient.

If the previous subframe is not a downlink subframe, then let $l_0=11$, $l_1=0$, $l_2=4$, which are substituted into equation (1) for calculating channel coefficient.

When modifying the channel estimation of the 4#OFDM symbol of the current subframe, linear interpolation can be carried out on the 4#OFDM symbol of the current subframe by using the 7#OFDM symbol of the current subframe and the 0#OFDM symbol of the current subframe, and then the channel estimation of the 4#OFDM symbol of the current subframe is added thereto, i.e. k=4. Equation (1) can be used to calculate the channel coefficient, let $l_0=0$, $l_1=4$ and $l_2=7$, which are substituted into equation (1) for calculation.

When modifying the channel estimation of the 7#OFDM symbol of the current subframe, linear interpolation can be carried out on the 7#OFDM symbol of the current subframe by using the 11#OFDM symbol of the current subframe and the 4#OFDM symbol of the current subframe, and then the channel estimation of the 7#OFDM symbol of the current subframe is added thereto, i.e. k=7. Equation (1) can be used to calculate the channel coefficient, let $l_0=4$, $l_1=7$ and $l_2=11$, which are substituted into equation (1) for calculation.

When modifying the channel estimation of the 11#OFDM symbol of the current subframe, linear interpolation can be carried out on the 11#OFDM symbol of the current subframe by using the 7#OFDM symbol of the current subframe and the 0#OFDM symbol of the next subframe, and then the channel estimation of the 11 #OFDM symbol of the current subframe is added thereto, i.e. k=11. Equation (1) can be used to calculate the channel coefficient, let $l_0=7$, $l_1=11$ and $l_2=14$, which are substituted into equation (1) for calculation.

When modifying the channel estimation of the 0#OFDM symbol of the next subframe, linear interpolation can be carried out on the 0#OFDM symbol of the next subframe by using the 11#OFDM symbol of the current subframe and the 4#OFDM symbol of the next subframe, and then the channel estimation of the 0#OFDM symbol of the next subframe is added thereto. Equation (1) can be used to calculate the channel coefficient, let $l_0=11$, $l_1=14$ and $l_2=18$, which are substituted into equation (1) for calculation.

After the first time domain interpolation, then the above fourth time domain interpolation unit 234 starts the second time domain interpolation, and can calculate the channel coefficient at an OFDM symbol which doesn't contain the reference signal by using the channel coefficient at the OFDM symbol containing the reference signal, so as to acquire the channel coefficients at all the OFDM symbols.

In the channel estimation device 20 in the orthogonal frequency division multiplexing system in this embodiment, by way of only carrying out frequency domain interpolation on the OFDM symbol containing the reference signal, the number of times of frequency domain interpolations is reduced, thus reducing the calculation complexity.

The forgoing is merely preferred embodiments of the present invention and not intended to limit the patent scope of the present invention, and any equivalent structures or equivalent flow variations made by using the description and accompanying drawings of the present invention are applied directly or indirectly in other relevant technical fields, which is included in the scope of patent protection of the present invention.

What we claim is:

1. A channel estimation method in an orthogonal frequency division multiplexing system, comprising steps of:
    A. grouping physical resource blocks in a bandwidth of the orthogonal frequency division multiplexing system;
    B. extracting at least one group from groups for channel estimation to acquire a channel coefficient, wherein the number of extracted groups is less than the total number of groups;
    C. completing multiple input multiple output (MIMO) demodulation by using the acquired channel coefficient; and
    D. judging whether the channel estimation on grouping has been completed, and if yes, ending, otherwise, returning to step B;
    wherein the channel estimation further comprises steps of:
        estimating the channel coefficient at a reference signal;
        carrying out a first time domain interpolation, changing the reference signal density at an orthogonal frequency division multiplexing (OFDM) symbol containing the reference signal to ⅓ of the reference signal density, and calculating the channel coefficient of a resource element at the OFDM symbol containing the reference signal;
        carrying out 3 times upsampling frequency domain interpolation on the OFDM symbol containing the reference signal and acquiring the channel coefficient at the OFDM symbol containing the reference signal; and
        carrying out a second time domain interpolation, calculating the channel coefficient at an OFDM symbol that doesn't contain the reference signal by using the channel coefficient at the OFDM symbol containing the reference signal, so as to acquire the channel coefficients at all the OFDM symbols.

2. The channel estimation method in the orthogonal frequency division multiplexing system according to claim 1, wherein calculating the channel coefficient of the resource element comprises steps of:

distinguishing information of the resource element and calculating the channel coefficient of the resource element according to the information of the resource element.

3. The channel estimation method in the orthogonal frequency division multiplexing system according to claim 2, wherein the channel estimation is carried out according to a following equation:

$$\tilde{H}_i(l_1, k) = \frac{l_2 - l_1}{l_2 - l_0} H_{i-1}(l'_0, k) + H_i(l'_1, k) + \frac{l_1 - l_0}{l_2 - l_0} H_i(l'_2, k)$$

the $$l'_0 = \begin{cases} l_0 & \text{if } l_0 \geq 0 \\ l_0 + N_{SymDL} & \text{if } l_0 < 0 \end{cases},$$

$$l'_1 = \begin{cases} l_1 & \text{if } l_1 < N_{SymDL} \\ l_1 + N_{SymDL} & \text{if } l_1 \geq N_{SymDL} \end{cases}, \text{ and}$$

$$l'_2 = \begin{cases} l_2 & \text{if } l_2 < N_{SymDL} \\ l_2 - N_{SymDL} & \text{if } l_2 \geq N_{SymDL} \end{cases};$$

wherein $N_{SymDL}$ is the number of OFDM symbols in a single subframe; $H_i(l'_1,k)$ represents a channel estimation value of a kth subcarrier of the OFDM symbol of a current subframe before modification; $\tilde{H}_i(l_1,k)$ represents a channel estimation value of the kth subcarrier of the OFDM symbol of the current subframe after modification; i represents the current subframe; i−1 represents a previous subframe, and k is an arrangement location of subcarrier; and wherein $l_o$, $l_1$, $l_2$ are variable integers.

4. The channel estimation method in the orthogonal frequency division multiplexing system according to claim 2, wherein the step of distinguishing information of the resource element and calculating the channel coefficient of the resource element according to the information of the resource element comprises:
judging whether to be a resource element on a first OFDM symbol within the current subframe;
if yes, then judging whether a previous subframe of the resource element is a downlink subframe, if the previous subframe of the resource element is the downlink subframe, then carrying out linear interpolation on the channel coefficient of the resource element by using channel coefficients of a previous resource element and a next resource element of the resource element, and if the previous subframe of the resource element is not the downlink subframe, then carrying out linear prediction to obtain by using the channel coefficients of next two resource elements of the resource element;
if no, then carrying out linear interpolation on the channel coefficient of the resource element by using the channel coefficients of the previous resource element and the next resource element of the resource element.

5. The channel estimation method in the orthogonal frequency division multiplexing system according to claim 1, wherein the channel estimation comprise steps of:
estimating the channel coefficient at a reference signal;
carrying out 6 times upsampling frequency domain interpolation on an OFDM symbol containing the reference signal and acquiring the channel coefficient at the OFDM symbol containing the reference signal;

carrying out a first time domain interpolation, and modifying the channel coefficient at the OFDM symbol containing the reference signal; and
carrying out a second time domain interpolation, calculating the channel coefficient at an OFDM symbol that doesn't contain the reference signal by using the channel coefficient at the OFDM symbol containing the reference signal, so as to acquire the channel coefficients at all the OFDM symbols.

6. A channel estimation device in an orthogonal frequency division multiplexing system, comprising a processor, which is configured to comprise:
a grouping module, which groups physical resource blocks in a bandwidth of the orthogonal frequency division multiplexing system;
an extraction estimation module, which extracts at least one group from groups for channel estimation to acquire a channel coefficient, wherein the number of extracted groups is less than the total number of groups;
a check module, which completes multiple input multiple output (MIMO) demodulation by using the acquired channel coefficient; and
a judgment module, which judges whether or not the channel estimation on grouping has been completed and notifies the extraction estimation module to continue extracting a group for channel estimation when the channel estimation has not been completed;
wherein the extraction estimation module further comprises:
a first estimation unit, which estimates the channel coefficient at a reference signal;
a first time domain interpolation unit, which carries out a first time domain interpolation, and changes the reference signal density at an OFDM symbol containing the reference signal to ⅓ of the reference signal density, and calculates the channel coefficient of a resource element at the OFDM symbol containing the reference signal;
a first frequency domain interpolation unit, which carries out 3 times upsampling frequency domain interpolation on the OFDM symbol containing the reference signal and acquires the channel coefficient at the OFDM symbol containing the reference signal; and
a second time domain interpolation unit, which carries out a second time domain interpolation, and calculates the channel coefficient at an OFDM symbol that doesn't contain the reference signal by using the channel coefficient at the OFDM symbol containing the reference signal, so as to acquire the channel coefficients at all the OFDM symbols.

7. The channel estimation device in the orthogonal frequency division multiplexing system according to claim 6, wherein the first time domain interpolation unit comprises:
a first judgment subunit, which judges whether to be a resource element on a first OFDM symbol within a current subframe;
a second judgment subunit, which judges whether or not a previous subframe of the resource element on the first OFDM symbol within the current subframe is a downlink subframe;
a first calculation subunit, which carries out linear interpolation on the channel coefficient of the resource element by using channel coefficients of a previous resource element and a next resource element of the resource element; and a second calculation subunit, which carries out linear prediction to obtain by using channel coefficients of next two resource elements of the resource element.

8. The channel estimation device in the orthogonal frequency division multiplexing system according to claim 6, wherein the extraction estimation module comprises:
a second estimation unit, which estimates the channel coefficient at a reference signal;
a second frequency domain interpolation unit, which carries out 6 times upsampling frequency domain interpolation on an OFDM symbol containing the reference signal and acquire the channel coefficient at the OFDM symbol containing the reference signal;
a third time domain interpolation unit, which carries out a first time domain interpolation, and modifies the channel coefficient at the OFDM symbol containing the reference signal; and
a fourth time domain interpolation unit, which carries out a second time domain interpolation, and calculates the channel coefficient at an OFDM symbol that doesn't contain the reference signal by using the channel coefficient at the OFDM symbol containing the reference signal, so as to acquire the channel coefficients at all the OFDM symbols.

* * * * *